US011852415B2

United States Patent
Götlind et al.

(10) Patent No.: US 11,852,415 B2
(45) Date of Patent: Dec. 26, 2023

(54) SYSTEM AND MIXING ARRANGEMENT FOR PREPARING AN ALUMINIUM MELT

(71) Applicant: Automotive Components Floby AB, Floby (SE)

(72) Inventors: Magnus Götlind, Floby (SE); Stefan Kristiansson, Broddetorp (SE); Anders Johansson, Vartofta (SE); Patrik Jansson, Skövde (SE)

(73) Assignee: Automotive Components Floby AB, Floby (SE)

( * ) Notice: Subject to any disclaimer, the term of this patent is extended or adjusted under 35 U.S.C. 154(b) by 196 days.

(21) Appl. No.: 17/287,724

(22) PCT Filed: Oct. 24, 2018

(86) PCT No.: PCT/EP2018/079095
§ 371 (c)(1),
(2) Date: Apr. 22, 2021

(87) PCT Pub. No.: WO2020/083476
PCT Pub. Date: Apr. 30, 2020

(65) Prior Publication Data
US 2021/0396473 A1     Dec. 23, 2021

(51) Int. Cl.
*F27D 27/00*     (2010.01)
*C22C 1/10*      (2023.01)
(Continued)

(52) U.S. Cl.
CPC .......... *F27D 27/00* (2013.01); *C22C 1/1036* (2013.01); *C22C 32/0063* (2013.01);
(Continued)

(58) Field of Classification Search
CPC .......... F27D 27/00; F27D 2003/0083; F27D 3/0033; F27D 13/00; F27D 2003/0006;
(Continued)

(56) References Cited

U.S. PATENT DOCUMENTS 2,890,039 A * 6/1959 Schmidt ................ C21C 7/0037
266/216
4,786,467 A  11/1988 Skibo et al.
(Continued)

FOREIGN PATENT DOCUMENTS

BE        532248 A      1/1958
CN     107385263 A     11/2007
(Continued)

OTHER PUBLICATIONS

English Translation of Russian Office Action issued for corresponding Russian National Stage Application No. 2021111392/05(024369) dated Mar. 15, 2022.
(Continued)

*Primary Examiner* — Jessee R Roe
*Assistant Examiner* — Michael Aboagye
(74) *Attorney, Agent, or Firm* — Renner, Otto, Boisselle, & Sklar, LLP (57) ABSTRACT

A system of obtaining an aluminium melt including SiC particles for use when moulding vehicle parts, e.g. brake disks, the system comprises a pre-processing tank (2), configured to receive SiC particles and to apply a pre-processing procedure to pre-process the SiC particles; a SiC particle transport member (4) configured to transport the pre-processed SiC particles from the pre-processing tank (2) to a crucible (6) of a melting furnace device (8), and the melting furnace device (8) is configured to receive and melt solid aluminium, e.g. aluminium slabs, and to hold an aluminium melt (10) and to receive said pre-processed SiC particles (12). The system also comprises a tube-like SiC particle mixing arrangement (14) defining and enclosing an elongated mixing chamber (16), the mixing arrangement (14) is configured to be mounted in said crucible (6) and structured to receive into said mixing chamber (16) said pre-processed SiC particles (12) via a first inlet (18) and said aluminium melt (10) via at least one second inlet (20), and to apply a mixing procedure by rotating a rotatable mixing member (22) arranged in said mixing chamber (16) about said longitudinal axis A, wherein said pre-processed SiC particles are mixed together with the aluminium melt in said mixing chamber. The mixing arrangement (14) is provided (Continued)

with at least one outlet (26) to feed out the mixture from said mixing chamber into said crucible.

16 Claims, 3 Drawing Sheets

(51) Int. Cl.
*C22C 32/00* (2006.01)
*F27D 3/18* (2006.01)
*F27D 3/08* (2006.01)
*F27D 13/00* (2006.01)
*F16D 65/16* (2006.01)
*F16D 65/12* (2006.01)
*F16D 65/02* (2006.01)
*F27D 3/00* (2006.01)

(52) U.S. Cl.
CPC .............. *F16D 65/125* (2013.01); *F27D 3/08* (2013.01); *F27D 3/18* (2013.01); *F27D 13/00* (2013.01); *C22C 1/1047* (2023.01); *F16D 2065/1308* (2013.01); *F16D 2200/003* (2013.01); *F16D 2200/0047* (2013.01); *F27D 2003/0006* (2013.01); *F27D 2003/0054* (2013.01); *F27D 2003/0083* (2013.01)

(58) Field of Classification Search
CPC ......... F27D 3/08; F27D 3/18; C22C 32/0063; C22C 1/1036; C22C 1/1047; F16D 2200/0047; F16D 65/125
USPC ..... 266/216, 222, 226, 235, 233; 366/157.1, 366/269, 270, 183.1
See application file for complete search history.

(56) References Cited

U.S. PATENT DOCUMENTS

| | | | | |
|---|---|---|---|---|
| 4,865,806 A | * | 9/1989 | Skibo | B01F 27/192 |
| | | | | 420/548 |
| 4,928,745 A | * | 5/1990 | Feest | C22C 1/1042 |
| | | | | 164/46 |
| 5,413,315 A | * | 5/1995 | Venas | C22B 9/05 |
| | | | | 266/216 |
| 6,106,588 A | | 8/2000 | Skibo et al. | |
| 6,547,850 B1 | * | 4/2003 | Skibo | B01F 23/53 |
| | | | | 366/306 |
| 6,821,447 B1 | | 11/2004 | Storstein et al. | |
| 11,268,167 B2 | * | 3/2022 | Hung | C22C 49/14 |
| 2012/0079916 A1 | | 4/2012 | Al-Qutub | |

FOREIGN PATENT DOCUMENTS

| | | | | |
|---|---|---|---|---|
| CN | 103103374 A | | 5/2013 | |
| CN | 102703771 B | | 8/2013 | |
| CN | 103484707 A | | 1/2014 | |
| CN | 105463265 A | | 4/2016 | |
| CN | 105525153 A | | 4/2016 | |
| CN | 107385263 | * | 11/2017 | ............ F27D 27/00 |
| CN | 107385263 A | | 11/2017 | |
| CN | 106521252 B | | 1/2018 | |
| CN | 108689726 A | | 10/2018 | |
| CN | 107100949 B | | 1/2019 | |
| JP | S57143456 A | | 9/1982 | |
| JP | 1991068728 A | | 3/1991 | |
| JP | H0371967 A | | 3/1991 | |
| JP | 2000160319 A | | 6/2000 | |
| JP | 2022511617 A | | 2/2022 | |
| KZ | 27170 A4 | | 7/2013 | |
| RU | 2356734 C1 | | 5/2009 | |
| RU | 117439 U1 | | 6/2012 | |
| SU | 1654379 A1 | | 7/1991 | |
| WO | 2012/035357 A1 | | 3/2012 | |
| WO | 2016152350 A1 | | 9/2016 | |

OTHER PUBLICATIONS

International Search Report and Written Opinion of the International Searching Authority for Corresponding International Application No. PCT/EP2018/079095, dated Jan. 9, 2019.

Original and English translation of Office Action issued for corresponding Japanese National Stage Application No. JP 2021520178, dated Nov. 1, 2023.

* cited by examiner

SYSTEM AND MIXING ARRANGEMENT FOR PREPARING AN ALUMINIUM MELT

This application is a national phase of International Application No. PCT/EP2018/079095, filed on Oct. 24, 2018.

TECHNICAL FIELD

The present disclosure relates to a system and a mixing arrangement for preparing an aluminium melt intended for vehicle parts, e.g. brake discs, of an aluminium alloy, which forms a matrix of silicon carbide particles, SiC.

BACKGROUND

Brakes for vehicles are well known. Typical brakes rely on friction, thus heat dissipation is of primary concern in brake design. Since the frictionally produced heat must be absorbed and dissipated, the brake rotor typically acts as a heat sink. As the rotor heats up, it absorbs heat, but if the temperature of the rotor increases faster than the rotor can cool down, severe damage to the rotor, the tire, and other wheel components is likely to occur. In most thermal applications, a larger heat sink is used to more effectively drain heat from a system. This typically involves increasing the physical dimensions of the heat sink, but increasing the size of a rotor is usually impractical, as an increase in size also requires an increase in moment of inertia of the rotor.

Thus, it is desirable to design e.g. a brake disc with a decreased mass but with the ability to better handle the thermal energy transferred thereto from the frictional braking. A large amount of effort has been made by automobile manufacturers to utilize aluminium metal matrix composite (AMC) brake discs in place of conventional gray cast iron brake discs. Such efforts have been undertaken with the goal of utilizing the favorable characteristics of AMCs, such as high thermal conductivity and low density when compared with cast iron. Thermal conductivity and expansion of AMC brake components can be tailored by adjusting the level and distribution of the particulate reinforcement. Thus, silicon carbide reinforced aluminium composites are increasingly being used as substitute materials for cylinder heads, liners, pistons, brake rotors, brake discs and calipers.

The reinforced particulate aluminium metal matrix composite for brakes provides an aluminium alloy strengthened with a dispersion of fine particulates, thus increasing the wear resistance thereof.

The composite is used to form a brake component, such as a brake rotor, a brake coupler or the like. The composite is formed from an aluminium metal matrix reinforced with ceramic particulates. The ceramic particulates have a particulate diameter between about 0.1 and 1.0 micrometers and form greater than about 10% by volume of the reinforced particulate aluminium metal matrix composite.

The aluminium metal matrix may be formed from any desired aluminium alloy, such as $AlSi_9Mg_{06}$, Al—Si, Al—Cu, 2xxx Al alloys, 6xxx Al alloys, 6160 Al alloy, 6061 Al alloy, or combinations thereof. Any desired ceramic material may be used to reinforce the aluminium metal matrix, such as $Al_2O_3$, SiC, C, $SiO_2$, B, BN, B4C, or AlN. Preferably, the ceramic particulate is substantially spherical in grain contouring, having a particle diameter on the order of about 0.7 micrometers, and may be processed by any suitable powder metallurgy technique or the like.

Silicon carbide (SiC), also known as carborundum, is a semiconductor containing silicon and carbon. It occurs in nature as the extremely rare mineral moissanite. Synthetic SiC powder has been mass-produced since 1893 for use as an abrasive. Grains of silicon carbide can be bonded together by sintering to form very hard ceramics that are widely used in applications requiring high endurance, such as car brakes, car clutches and ceramic plates in bulletproof vests.

Silicon-infiltrated carbon-carbon composite is used for high performance "ceramic" brake discs or e.g. brake rotors, as it is able to withstand extreme temperatures. The silicon reacts with the graphite in the carbon-carbon composite to become carbon-fiber-reinforced silicon carbide (C/SiC). An example of such a brake disc is shown in U.S. Pat. No. 6,821,447.

The volume of SiC is approximately 20% but can be varied to balance the material's performance to the car and the material cast/mouldability and machinability.

In the patent literature there are many examples of including SiC particles to aluminium in brake components. Below some related patent documents will be briefly discussed.

CN107100949 discloses a composite brake disc of an aluminium matrix and SiC particles, as well as a method of manufacturing the same.

US2012079916 discloses a braking component consisting of an aluminium matrix with ceramic particles. SiC is indicated as an example of particles. Concerning manufacture, reference is made to conventional methods.

JP2000160319 shows the supply of SiC particles to powder of an Mg, Al, Al—Mg alloy. In the document it is mentioned fluidization using nitrogen.

JPH0371967 discloses a method for introducing SiC particles into an aluminium melt. Urea is used as a means for inserting the SiC particles. Dispersing element of small piece form was sequentially introduced into the molten metal, agitating a molten metal with a propeller of an agitating device. In this case, the urea resin of the dispersing element was evaporated when heated by the molten metal, and only SiC particles were incorporated into the molten metal.

CN105525153 discloses a brake disc for trains. The brake disc comprises SiC particles in an aluminium matrix. It also describes the preparation of the SiC particles being pre-treated and heated. The aluminium melt with the SiC particles is then stirred.

CN103484707 shows the manufacture of, for example, brake discs of an aluminium alloy with SiC particles. In this document is disclosed a preparation method for SiC particle reinforced aluminium-based composite material.

CN103103374 discloses the manufacture of a material comprising an aluminium matrix with SiC particles. The method provided in this document aims to solve the problems of the stirring casting method of needing to evenly distribute reinforcements in the matrix metal, and needing to avoid harmful reaction between the reinforcements and the metal at high temperatures, and reducing the casting shortcomings generated in the solidification process.

CN102703771 shows the production of brake discs of an aluminium alloy with SiC particles. The disclosure relates to the technical field of a brake disc and particularly relates to a preparation method for a silicon carbide/aluminium alloy composite material for a brake disc.

CN106521252 shows manufacturing of brake discs of an aluminium alloy with SiC particles. Disclosed are a silicon carbide particle reinforcement aluminium-based composite for a train brake disc and a preparation method. The SiC thin particles are added in the form of Mg—SiC, so that the problems of uniform dispersing difficulty of silicon carbide particles in a matrix and poor interface bonding are effectively solved.

CN105463265 discloses a method for preparing an aluminium alloy with SiC particles, and comprises a preparation method for a silicon carbide particle reinforced aluminium-based composite material, and relates to the field of aluminium-based composite materials.

It has been found that agglomeration of SiC particles in the aluminium melt may negatively affect the performance of a vehicle component, e.g. the brake disc, moulded by the melt. A reason is that the SiC particles then are not evenly distributed in the aluminium melt e.g. resulting in that braking effect and braking wear of the brake discs will not be fully predictable.

Thus, the object of the present invention is to improve the presently used techniques of obtaining an aluminium melt including SiC particles, especially adapted for moulding brake discs.

SUMMARY

The above-mentioned object is achieved by the present invention according to the independent claims.

Preferred embodiments are set forth in the dependent claims.

According to one aspect of the present invention a system of obtaining an aluminium melt including SiC particles for use when moulding vehicle parts, e.g. brake disks, is provided. The system comprises a pre-processing tank, configured to receive SiC particles and to apply a pre-processing procedure to pre-process the SiC particles; a SiC particle transport member configured to transport the pre-processed particles from the pre-processing tank to a crucible of a melting furnace device which is configured to receive and melt solid aluminium, e.g. aluminium slabs, and to hold an aluminium melt (and to receive the pre-processed SiC particles. The system also comprises a tube-like SiC particle mixing arrangement defining and enclosing an elongated mixing chamber. The mixing arrangement is configured to be mounted in the crucible such that, during use, it is in an essentially vertical position, and that the mixing arrangement is elongated along a longitudinal axis A and structured to receive into the mixing chamber the pre-processed SiC particles via a first inlet and the aluminium melt via at least one second inlet. Furthermore, the mixing arrangement is configured to apply a mixing procedure by rotating a rotatable mixing member arranged in the mixing chamber about the longitudinal axis A, wherein said pre-processed SiC particles are mixed together with the aluminium melt in said mixing chamber. The mixing member is configured to cooperate with an inner wall surface of the mixing chamber resulting in that mechanical shear forces obtained between the mixing member and the inner wall surface during rotation submitted to the SiC particles and aluminium melt result in high wetting of SiC particles in the aluminium melt. The mixing member is structured to provide movement forces to the mixture of aluminium melt and SiC particles, and the mixing arrangement is provided with at least one outlet to feed out the mixture from said mixing chamber into the crucible.

According to one embodiment the pre-processing tank is a fluidization tank and that the pre-processing procedure is a fluidization procedure including heating and fluidizing of the SiC particles.

According to another aspect the present invention relates to a mixing arrangement configured to be mounted in a crucible and provided with the features which has been described above.

The disclosed system and mixing arrangement will thus achieve an improved wetting of SiC particles in the aluminium melt which results in that mixing of aluminium and SiC particles is improved such that essentially no agglomeration of SiC particles will occur.

DETAILED DESCRIPTION

The system will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
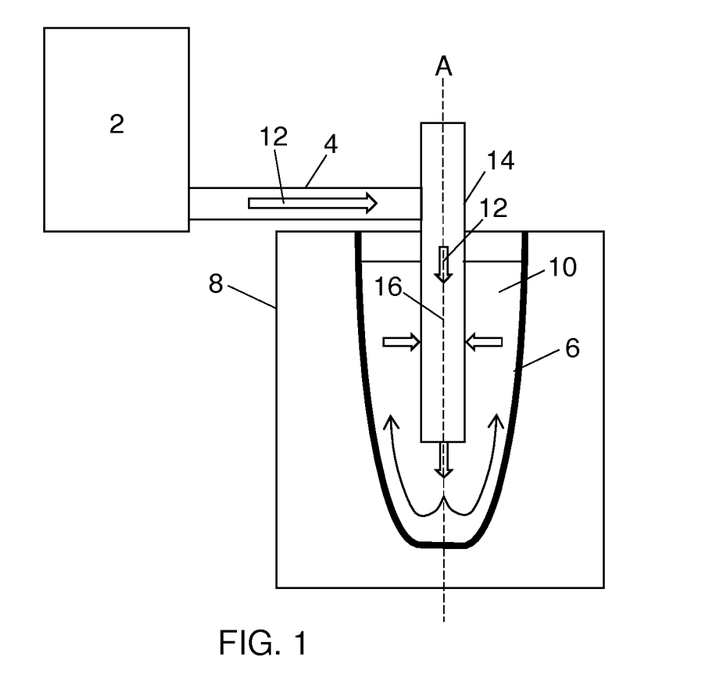
FIG. 1 is a schematic illustration of the system according to the present invention.

First with reference to the schematic illustration in FIG. 1 a system of obtaining an aluminium melt including SiC particles for use when moulding vehicle parts, e.g. brake disks, is provided. The system comprises a pre-processing tank 2, configured to receive SiC particles and to apply a pre-processing procedure to pre-process the SiC particles. A SiC particle transport member 4 is further provided configured to transport the pre-processed SiC particles from the pre-processing tank 2 to a crucible 6 of a melting furnace device 8. The SiC particles introduced into the pre-processing tank may exist in different size fractions, e.g. in three different size fractions, in the range of 10-30 µm, preferably 13-23 µm. The melting furnace device 8 is configured to receive and melt solid aluminium, e.g. aluminium slabs, and to hold an aluminium melt 10 and also to receive the pre-processed SiC particles 12. Preferably, the maximum temperature of the aluminium melt is 750° C. to avoid aluminium carbides.

The system also comprises a tube-like SiC particle mixing arrangement 14 defining and enclosing an elongated mixing chamber 16, and that the mixing arrangement 14 is configured to be mounted in the crucible 6 such that, during use, it is in an essentially vertical position, and that the mixing arrangement is elongated along a longitudinal axis A.

Figure 3:
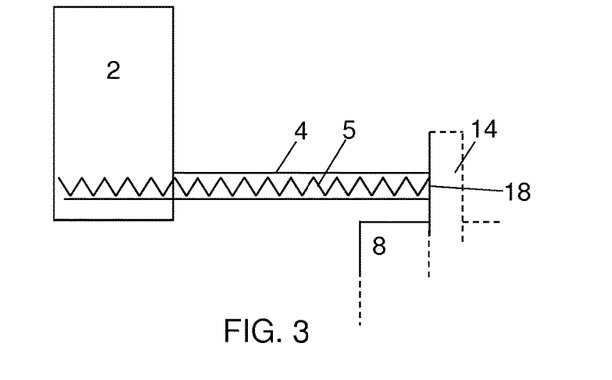
FIG. 3 is a schematic illustration of the transport member applied in the system.

In FIG. 3 a schematic side view illustration of the SiC particle transport member 4 which is applicable herein. The transport member is configured to transport the pre-processed SiC particles from the pre-processing tank 2 to the crucible of the melting furnace device 8. The transport member is preferably provided with a screw transporting means 5 provided in a tube that is arranged such that it is inserted through a bottom part of the pre-processing tank for receiving the particles to be transported. The screw transporting means 5 are then rotated and the pre-processed particles are thereby transported to the melting furnace device where the tube is mounted to supply pre-processed particles to the mixing arrangement 14 via a first inlet 18. The transport member may naturally instead comprise e.g. a conveyor belt to transport the particles.

The mixing arrangement 14 is further illustrated in FIGS. 4-7 and is structured to receive, into the mixing chamber 16, the pre-processed SiC particles 12 via the first inlet 18 and the aluminium melt 10 via at least one second inlet 20, and to apply a mixing procedure by rotating a rotatable mixing member 22 arranged in the mixing chamber 16 about the longitudinal axis A. Thereby the pre-processed SiC particles are mixed together with the aluminium melt in the mixing chamber.

The mixing member 22 is configured to cooperate with an inner wall surface 24 of the mixing chamber 16 resulting in that mechanical shear forces obtained between the mixing member and the inner wall surface during rotation submitted to the SiC particles and aluminium melt result in high wetting of SiC particles in the aluminium melt.

The mixing arrangement 14 is provided with at least one outlet 26 to feed out the mixture from the mixing chamber into said crucible. The mixing member is structured to provide movement forces to the mixture of aluminium melt and SiC particles. In FIG. 1 it is indicated by arrows that the mixture of aluminium melt and SiC particles will circulate within the crucible during the mixing procedure. This circulation, or stirring, is provided by the movement forces of the mixing member. A mixing procedure will last for at least 20 minutes from when the SiC particles were inserted into the crucible.

Figure 5:
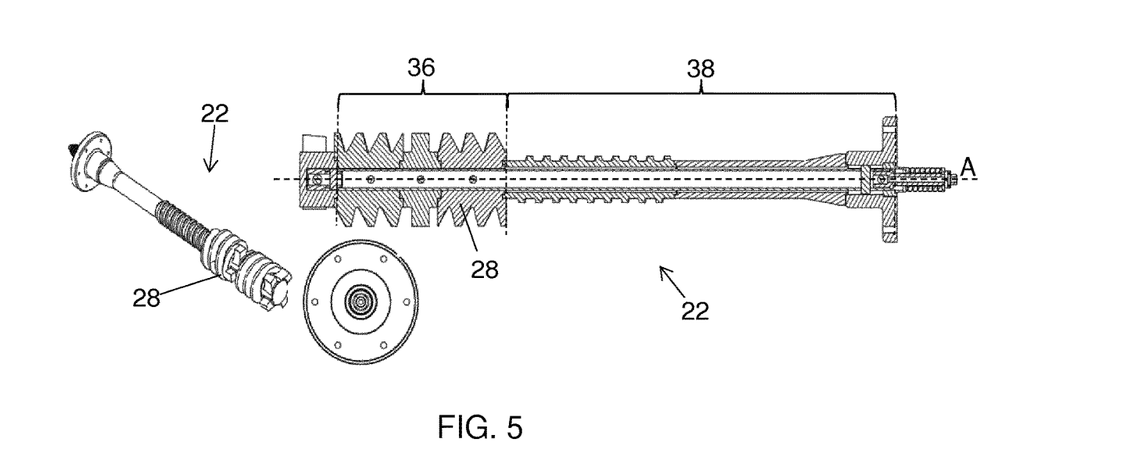
FIG. 5 shows various views of a rotatable mixing member.
Figure 6:
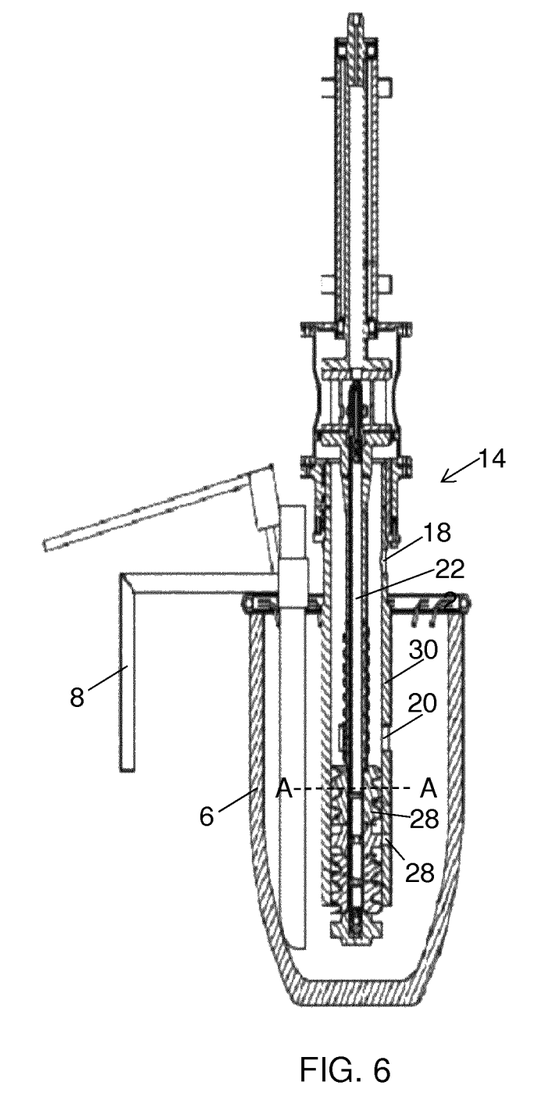
FIG. 6 shows a cross-sectional side view of melting furnace device according to one embodiment of the present invention.
Figure 7:
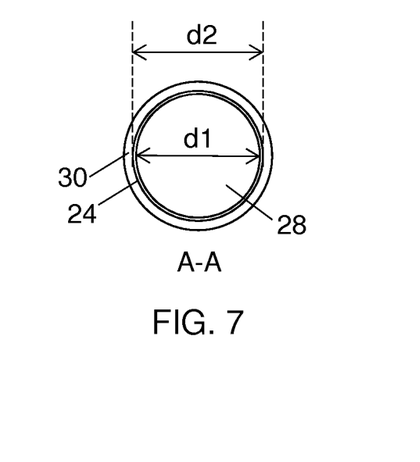
FIG. 7 shows a cross-sectional view of the mixing arrangement according to one embodiment of the present invention.

In one embodiment the mixing member 22 is provided with a screw-like member 28 comprising radially extending threads running along the screw-like member. This embodiment is illustrated in FIGS. 5-7. The screw-like member 28 has an outer diameter d1 that is slightly less than an inner diameter d2 of the inner wall surface 24 of the mixing chamber 16, and that d2−d1 is less than 0.15 mm, preferably less than 0.10 mm (see FIG. 7). Careful control of wear/play between screw-like member and the inner wall surface is required as excessive wear causes too low shear forces, which ultimately results in that non-wetted particles may be introduced into the melt.

Figure 4:
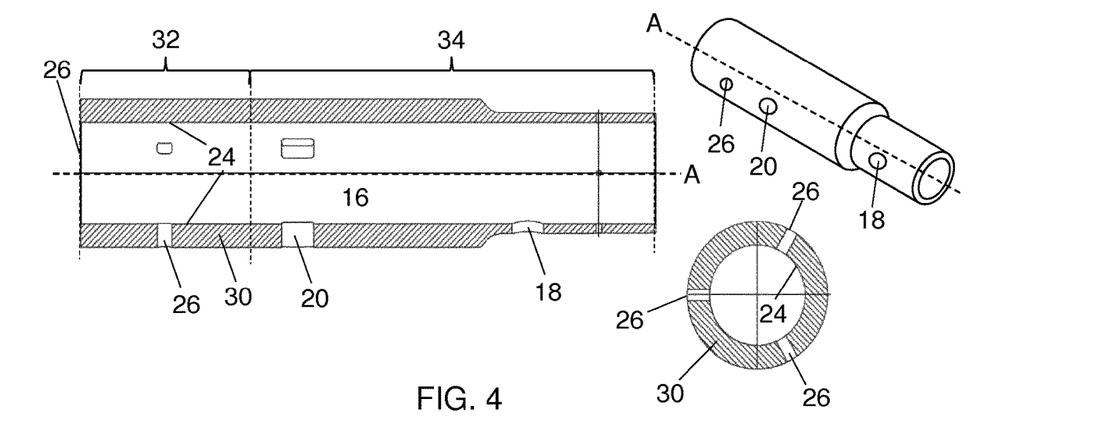
FIG. 4 shows various views of a housing of the mixing arrangement according to one embodiment of the present invention.

With references to FIG. 4 various views of the housing to the SiC particle mixing arrangement 14 are shown. To the left is shown a cross-sectional view along the longitudinal axis A. The upper right illustration shows a perspective view, and the lower right illustration shows a cross-sectional view in a perpendicular direction in relation to axis A.

The mixing arrangement 14 comprises an elongated housing having a housing wall 30 defining the mixing chamber 16. The housing comprises a first body part 32, and a second body part 34. More particularly, the housing wall 30 has a cylinder-like shape having an essentially circular cross-section, and the first inlet 18 and the at least one second inlet 20 are arranged in the second body part 34. The at least one outlet 26 is arranged in the first body part 32. During use, the mixing arrangement 14 is submersed into the aluminium melt 10 such that the first inlet is above the aluminium melt and the at least one second inlet is submersed into said aluminium melt.

With references to FIG. 5 various views of the rotatable mixing member 22 are shown. To the right is shown a cross-sectional view along the longitudinal axis A. To the left a perspective view is shown and below a view from above.

The mixing member 22 is to be inserted into the housing of the mixing arrangement and has an elongated shape adapted to the mixing chamber. The mixing member is configured to be arranged within the housing of the mixing arrangement such that a first part 36 of the mixing member is to be arranged in the first body part 32 of the housing and a second part 38 of the mixing member is to be arranged in the second body part 34 of the housing. The first part 36 is provided with the screw-like member 28. The assembled mixing arrangement 14 is shown in FIG. 6 mounted in the crucible.

During use of the mixing arrangement 14, one of the at least one outlets 26 is directed downwards, and the mixture of SiC particles and aluminium melt is forced out through the outlet by rotation of the screw-like member. As seen from FIG. 4 further outlets 26 may be provided through the wall of the first body part 32.

The mixing arrangement is made from any suitable material that can withstand working temperatures up to at least 800° C., and preferably up to at least 1000° C., e.g. various graphite materials. In one advantageous set-up the housing is made from Diamante ISO Universal and the mixing member is made from graphite EG92.

According to one embodiment the high wetting of SiC particles in the aluminium melt being defined by a contact angle being less than 90° in order to minimize agglomeration. In the following the term "wetting" will be further discussed.

Wetting is the ability of a liquid to maintain contact with a solid surface, resulting from intermolecular interactions when the two are brought together. The degree of wetting (wettability) is determined by a force balance between adhesive and cohesive forces. Wetting deals with the three phases of materials: gas, liquid, and solid. Wetting is important in the bonding or adherence of two materials.

Adhesive forces between a liquid and solid cause a liquid drop to spread across the surface. Cohesive forces within the liquid cause the drop to ball up and avoid contact with the surface.

The contact angle is defined as the angle at which the liquid-vapor interface meets the solid-liquid interface. The contact angle is determined by the balance between adhesive and cohesive forces. As the tendency of a drop to spread out over a flat, solid surface increases, the contact angle decreases. Thus, the contact angle provides an inverse measure of wettability. A contact angle less than 90° (low contact angle) indicates that wetting of the surface is very favorable, and the fluid will spread over a large area of the surface. Contact angles greater than 90° (high contact angle) generally means that wetting of the surface is unfavorable, so the fluid will minimize contact with the surface and form a compact liquid droplet.

Figure 2:
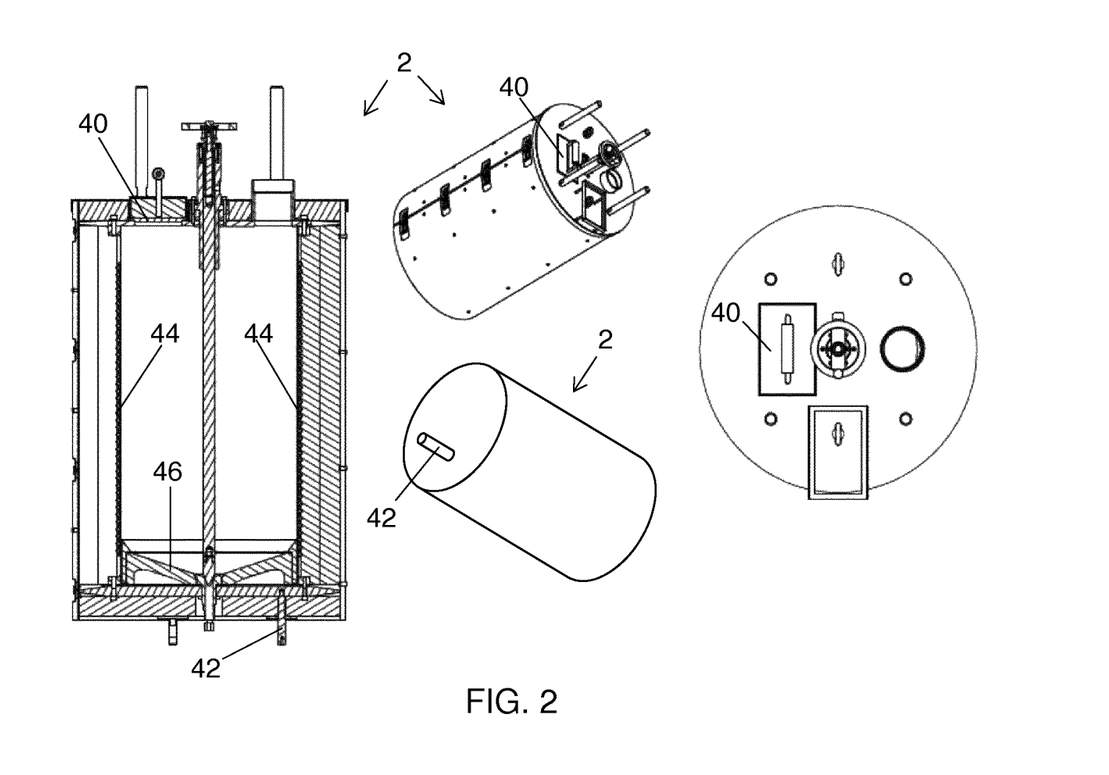
FIG. 2 shows various views of a pre-processing tank applied in the system.

According to another embodiment the pre-processing tank 2 is a fluidization tank, and that the pre-processing procedure is a fluidization procedure including heating and fluidizing of the SiC particles. In FIG. 2 is shown various views of the fluidization tank; to the left is shown a cross-sectional view along a longitudinal axis of the tank, to the right is shown a view from above, and in the top middle figure is shown a perspective view from above, and in the bottom middle figure is shown a perspective view from below.

The fluidization procedure is performed during a predetermined time period, which is at least 45 minutes, and preferably at least one hour.

During the fluidization procedure the SiC particles are heated up to at least 400° C., but preferably up to about 1200° C., in order to achieve a protective oxide layer of $SiO_2$ around the SiC particles. In an advantageous fluidization procedure the fluidization and heating was performed during approximately one hour at a temperature of above 1000° C., and most preferred up to about 1200° C. A heating arrangement 44 is provided configured to heat the pre-processing tank up to at least 400° C., but preferably up to about 1200° C. The heating arrangement 44 may e.g. be a heating coil wound around the tank. Outside the heating arrangement a temperature insulating layer is arranged. In one advantageous variation the outer cross-sectional dimension of the fluidization tank is approximately 1000 mm and the inner cavity is has a diameter in the range of 700-800 mm.

The fluidization tank is provided with at least one opening 40 in an upper part of the tank where the SiC particles are to be introduced into the tank. The fluidization tank is provided with at least one supply pipe 42 through a bottom of the tank where a fluidization gas is supplied to the tank. The fluidization gas is an inert gas, preferably nitrogen, and is introduced into the tank at a rate of 20-35 litre/minute, preferably 25-30 litre/minute.

In order to achieve an essentially even fluidization gas stream directed upwards a gas flow controlling member 46 is provided at the bottom of the tank. The controlling member is essentially disc-shaped and has preferably a conical shape having its lowest point in the centre of the bottom end surface of the tank. The controlling member is provided with numerous small openings (not shown) to spread the gas flow evenly over the entire cross-section the tank. The controlling member 46 is made from any suitable material that may provide the even gas stream throughout the temperature range up to above 1200° C. One suitable material is graphite quality ISEM-1.

Fluidization is a process similar to liquefaction whereby a granular material is converted from a static solid-like state to a dynamic fluid-like state. This process occurs when a fluid (liquid or gas) is passed up through the granular material.

When a gas flow is introduced through the bottom of a bed of solid particles, it will move upwards through the bed via the empty spaces between the particles. At low gas velocities, aerodynamic drag on each particle is also low, and thus the bed remains in a fixed state. Increasing the velocity, the aerodynamic drag forces will begin to counteract the gravitational forces, causing the bed to expand in volume as the particles move away from each other. Further increasing the velocity, it will reach a critical value at which the upward drag forces will exactly equal the downward gravitational forces, causing the particles to become suspended within the fluid. At this critical value, the bed is said to be fluidized and will exhibit fluidic behavior. By further increasing gas velocity, the bulk density of the bed will continue to decrease, and its fluidization becomes more violent, until the particles no longer form a bed and are "conveyed" upwards by the gas flow.

When fluidized, a bed of solid particles will behave as a fluid, like a liquid or gas. The fluidic behavior allows the particles to be transported like a fluid, and channeled through pipes.

Herein, particle agglomeration refers to formation of assemblages in a suspension and represents a mechanism leading to destabilization of colloidal systems. During this process, particles dispersed in the liquid phase stick to each other, and spontaneously form irregular particle clusters, flocs, or aggregates. Agglomerated SiC particles in the aluminium melt should be avoided as it may result in a more unpredictable behavior of the brake disc.

The present invention also relates to a tube-like SiC particle mixing arrangement 14 to be applied for obtaining an aluminium melt including SiC particles for use when moulding vehicle parts, e.g. brake discs. The mixing arrangement 14 has been described above in relation to the system and it is here referred to that description. However, in the following the mixing arrangement will be described in particular with references to FIGS. 1 and 4-7.

The mixing arrangement is structured to define and enclose an elongated mixing chamber 16, and is configured to be mounted in a crucible 6 of a melting furnace device 8 such that, during use, the mixing arrangement is in a vertical position. The mixing arrangement is elongated along a longitudinal axis A and structured to receive into the mixing chamber SiC particles 12 via a first inlet 18 and aluminium melt 10 via at least one second inlet 20. Furthermore, the mixing arrangement is configured to apply a mixing procedure by rotating a rotatable mixing member 22 arranged in the mixing chamber about the longitudinal axis A, and that the SiC particles are mixed together with the aluminium melt in the mixing chamber during the rotation.

The mixing member 22 is configured to cooperate with an inner wall surface 24 of the mixing chamber resulting in that mechanical shear forces obtained between the mixing member and the inner wall surface during rotation submitted to the SiC particles and aluminium melt result in high wetting of SiC particles in the aluminium melt. The mixing member 22 is structured to provide movement forces to the mixture of aluminium melt and SiC particles, and that the mixing arrangement is provided with at least one outlet 26 to feed out the mixture from said mixing chamber 16 into said crucible 6.

According to one embodiment the mixing member 22 is provided with a screw-like member 28 comprising radially extending threads running along the screw-like member. The screw-like member has an outer diameter d1 that is slightly less than an inner diameter d2 of the inner wall surface of the mixing chamber, and that d2–d1 is less than 0.15 mm, preferably less than 0.10 mm (see FIG. 7).

The mixing arrangement 14 comprises an elongated housing having a housing wall 30 defining the mixing chamber 16. The housing comprises a first body part 32, and a second body part 34. More particularly, the housing wall 30 has a cylinder-like shape having an essentially circular cross-section, and the first inlet 18 and the at least one second inlet 20 are arranged in the second body part 34. The at least one outlet 26 is arranged in the first body part 32. During use, the mixing arrangement 14 is submersed into the aluminium melt 10 such that the first inlet is above the aluminium melt and the at least one second inlet is submersed into said aluminium melt.

With references to FIG. 5 various views of the rotatable mixing member 22 are shown. To the right is shown a cross-sectional view along the longitudinal axis A. To the left a perspective view is shown and below a view from above. The mixing member 22 is to be inserted into the housing of the mixing arrangement and has an elongated shape adapted to the mixing chamber. The mixing member is configured to be arranged within the housing of the mixing arrangement such that a first part 36 of the mixing member is to be arranged in the first body part 32 of the housing and a second part 38 of the mixing member is to be arranged in the second body part 34 of the housing. The first part 36 is provided with the screw-like member 28. The assembled mixing arrangement 14 is shown in FIG. 6 mounted in the crucible.

During use of the mixing arrangement 14, one of said at least one outlets 26 is directed downwards, and the mixture of SiC particles and aluminium melt is forced out through the outlet by rotation of the screw-like member.

According to one embodiment the high wetting of SiC particles in the aluminium melt being defined by a contact angle being less than 90° in order to minimize agglomeration. The wetting is discussed more in detail above in relation to the description of the system.

In the figures items are shown but not having been described herein; the reason is that these items illustrate conventional technique that may be realised in many different ways. One example is in FIG. 6, where members are shown inserted into the crucible. These members are conventional items used e.g. to provide stirring or movement of the aluminium melt. Furthermore, in FIG. 6 is also shown means adapted to provide the rotational movement to the movement member 22.

The present invention also relates to a brake disc moulded of an aluminium melt with SiC particles that has been prepared by a system or by a mixing arrangement as described above. Specifically the brake disc will then achieve a desired Dendrite Arm Space (DAS) in the range of 15-25 µm.

In order to improve the above described system the melting furnace device is adapted to receive grain refiners which is introduced into the aluminium melt prior to the introduction of the SiC particles, wherein the grain refiners will further improve the wetting of the SiC particles in the aluminium melt.

It is important to minimize melt exposure to oxygen as this increases the risk of agglomeration. After the particles are wetted, the melt must be stirred continually otherwise, the particles fall into the melt (about 1 mm/min) and begin to agglomerate. When the particles have been introduced and wetted the mixing arrangement is removed and a conventional stirring means is applied to continue the stirring. Refined melt should not be kept warm for longer than 24 hours as it then begins to be destroyed and get a slurry-like consistency.

After feeding of the SiC particles and the aluminium melt is fully enriched, casting takes place according to established procedures.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A system of obtaining an aluminium melt including SiC particles for use when moulding vehicle parts, the system comprises:
a pre-processing tank, configured to receive SiC particles and to apply a pre-processing procedure to pre-process the SiC particles;
a SiC particle transport member configured to transport the pre-processed SiC particles from the pre-processing tank to a crucible of a melting furnace device, and
the melting furnace device is configured to receive and melt solid aluminium, and to hold the aluminium melt and to receive said pre-processed SiC particles, wherein said system also comprises a tube-like SiC particle mixing arrangement defining an enclosure for an elongated mixing chamber, the mixing arrangement is configured to be mounted in said crucible such that, it is in an essentially vertical position, and that the mixing arrangement is elongated along a longitudinal axis A and structured to receive into said mixing chamber said pre-processed SiC particles via a first inlet and said aluminium melt via at least one second inlet, and to apply a mixing procedure by rotating a rotatable mixing member arranged in said mixing chamber about said longitudinal axis A, wherein said pre-processed SiC particles are mixed together with the aluminium melt in said mixing chamber,
and wherein said mixing member is configured to cooperate with an inner wall surface of the mixing chamber resulting in that mechanical shear forces obtained between the mixing member and the inner wall surface during rotation submitted to the SiC particles and aluminium melt result in high wetting of SiC particles in the aluminium melt and that said mixing member is structured to provide movement forces to said mixture of aluminium melt and SiC particles, and wherein said mixing arrangement is provided with at least one outlet to feed out the mixture from said mixing chamber into said crucible;
wherein SiC particle mixing arrangement comprises an elongated housing having a housing wall defining said mixing chamber, and wherein the housing comprises a first body part and a second body part; and
wherein said housing wall has a cylinder-like shape having an essentially circular cross-section, and wherein said first inlet and said at least one second inlet are arranged in said second body part, and said at least one outlet is arranged in said first body part, and wherein, the mixing arrangement is configured to be submersed into said aluminium melt such that said first inlet is above said aluminum melt and said at least one second inlet is submersed into said aluminium melt.

2. The system according to claim 1, wherein said mixing member is provided with a screw-like member comprising radially extending threads running along the screw-like member, wherein the screw-like member has an outer diameter d1 that is slightly less than an inner diameter d2 of said inner wall surface of the mixing chamber, and wherein d2−d1 is less than 0.15 mm.

3. The system according to claim 2, wherein said rotatable mixing member has an elongated shape adapted to the mixing chamber, and comprises a first part configured to be arranged in said first body part of the housing and a second part configured to be arranged in said second body part of the housing, and wherein said first part is provided with said screw-like member.

4. The system according to claim 1, wherein said mixing member is provided with a screw-like member comprising radially extending threads running along the screw-like member, and wherein the screw-like member is configured such that said mixture of SiC particles and aluminium melt is forced out through a downward directed outlet of said at least one outlet by rotation of said screw-like member.

5. The system according to claim 1, wherein said high wetting being defined by a contact angle being less than 90° in order to minimize agglomeration.

6. The system according to claim 1, wherein said pre-processing tank is a fluidization tank, and that said pre-processing procedure applied by the fluidization tank is a fluidization procedure including heating and fluidizing of said SiC particles.

7. The system according to claim 6, wherein said heating provided by said fluidization tank is configured to heat said SiC particles up to at least 400° C. in order to achieve a protective oxide layer around said SiC particles.

8. The system according to claim 7, wherein said predetermined time period is at least 45 minutes.

9. The system according to claim 6, wherein said fluidization tank is provided with at least one opening in an upper part of the tank where said SiC particles are to be introduced into the tank, and that said fluidization tank is provided with at least one supply pipe through a bottom of the tank where a fluidization gas is supplied to the tank.

10. The system according to claim 9, wherein said fluidization gas is an inert gas and wherein said fluidization gas is introduced into the tank at a rate of 20-35 litre/minute.

11. The system according to claim 1, wherein a heating arrangement is provided configured to heat said pre-processing tank up to at least 400° C. in order to achieve a protective oxide layer around said SiC particles.

12. A tube-like SiC particle mixing arrangement to be applied for obtaining an aluminium melt including SiC particles for use when moulding vehicle parts, wherein said mixing arrangement is structured to define an enclosure for an elongated mixing chamber, the mixing arrangement is configured to be mounted in a crucible of a melting furnace device such that, the mixing arrangement is in a vertical position, and that the mixing arrangement is elongated along a longitudinal axis A and structured to receive into said mixing chamber SiC particles via a first inlet and aluminium melt via at least one second inlet, and to apply a mixing procedure by rotating a rotatable mixing member arranged in said mixing chamber about said longitudinal axis A, wherein said SiC particles are mixed together with the aluminium melt in said mixing chamber, and wherein said mixing member is configured to cooperate with an inner wall surface of the mixing chamber resulting in that mechanical shear forces obtained between the mixing member and the inner wall surface during rotation submitted to the SiC particles and aluminium melt result in high wetting of SiC particles in the aluminium melt and that said mixing member is structured to provide movement forces to said mixture of aluminium melt and SiC particles, and wherein said mixing arrangement is provided with at least one outlet to feed out the mixture from said mixing chamber into said crucible;

an elongated housing having a housing wall defining said mixing chamber, and wherein the housing comprises a first body part and a second body part;

wherein said housing wall has a cylinder-like shape having an essentially circular cross-section, and wherein said first inlet and said at least one second inlet are arranged in said second body part, and said at least one outlet is arranged in said first body part, and wherein the mixing arrangement is configured to be submersed into said aluminium melt such that said first inlet is above said aluminium melt and said at least one second inlet is submersed into said aluminium melt.

13. The mixing arrangement according to claim 12, wherein said mixing member is provided with a screw-like member comprising radially extending threads running along the screw-like member, wherein the screw-like member has an outer diameter d1 that is slightly less than an inner diameter d2 of said inner wall surface of the mixing chamber, and wherein d2–d1 is less than 0.15 mm.

14. The mixing arrangement according to claim 12, wherein said mixing member is provided with a screw-like member comprising radially extending threads running along the screw-like member, and wherein said rotatable mixing member has an elongated shape adapted to the mixing chamber, and comprises a first part configured to be arranged in said first body part of the housing and a second part configured to be arranged in said second body part of the housing, and wherein said first part is provided with said screw-like member.

15. The mixing arrangement according to claim 12, wherein said mixing member is provided with a screw-like member comprising radially extending threads running along the screw-like member, and wherein the screw-like member is configures such that said mixture of SiC particles and aluminium melt is forced out through a downward directed outlet of said at least one outlets by rotation of said screw-like member.

16. The mixing arrangement according to claim 12, wherein said high wetting being defined by a contact angle being less than 90°.

* * * * *